United States Patent [19]

Eddens

[11] 4,085,344
[45] Apr. 18, 1978

[54] COOLING FOR MAGNETIC PARTICLE DEVICES

[75] Inventor: Gerald R. Eddens, St. Louis County, Mo.

[73] Assignee: W. J. Industries, Inc., St. Louis, Mo.

[21] Appl. No.: 730,137

[22] Filed: Oct. 6, 1976

[51] Int. Cl.² ............................................. H02K 9/00
[52] U.S. Cl. ..................................... 310/58; 310/92; 310/93; 192/113 A
[58] Field of Search .................. 310/92, 93, 103, 105, 310/114, 96, 97, 98, 58, 62, 63, 89; 192/113 A; 188/158, 159, 161, 162, 164

[56] References Cited

U.S. PATENT DOCUMENTS

| 2,791,308 | 5/1957 | Barrett et al. | 310/93 X |
| 2,795,711 | 6/1957 | Miller | 310/92 X |
| 2,885,045 | 5/1959 | Barrett | 192/113 A X |
| 3,076,109 | 1/1963 | Cohen et al. | 310/105 |
| 3,208,567 | 9/1965 | Metzger | 192/113 A X |
| 3,382,384 | 5/1968 | Hulls | 310/93 |
| 3,394,278 | 7/1968 | Schetinin | 310/92 X |
| 3,748,507 | 7/1973 | Sieber | 310/58 |
| 3,761,748 | 9/1973 | Baumann | 310/58 |
| 4,009,405 | 2/1977 | Gleichman | 310/58 |

Primary Examiner—Mark O. Budd
Attorney, Agent, or Firm—Charles B. Haverstock

[57] ABSTRACT

A magnetic particle apparatus having spaced relatively movable members with magnetic particles positioned therebetween and electromagnetic field producing mechanism to generate a magnetic field between the relatively movable members through the magnetic particles to establish coupling therebetween, the improvements to such apparatus being embodied in an improved cast iron construction for many parts of the subject apparatus, a more efficient safer apparatus, improved apparatus for circulating cooling air through and closely adjacent to the heat producing components to dissipate heat generated while providing support for the drive cylinder and maintaining the magnetic particles in their most advantageous positions, an improved magnetic gap construction which minimizes flux leakage and increases operating efficiency, including a saturable bridge which enables use of a bobbin of one-piece construction without shunting out flux, and the present construction includes structural members arranged to form a circuitous passage for the flow of cooling air through the device so that the cooling air comes into contact with and moves into contact with more different surfaces in the present device to produce more efficient cooling. The present construction also lends itself to modular design of a relatively compact construction which have important structural and operational advantages and enable the present construction to be mounted in smaller spaces and in places where access is limited. The present construction also lends itself to being constructed for use in magnetic particle brakes as well as in magnetic particle clutches.

12 Claims, 5 Drawing Figures

COOLING FOR MAGNETIC PARTICLE DEVICES

Magnetic particle devices have been known for some time and are used for many different purposes and particularly in devices where it is necessary or desirable to be able to accurately control and/or adjust the coupling between two members for some purpose. In magnetic particle devices the coupling is varied by varying the strength of a magnetic field which is formed by and between two spaced relatively movable members and where the space between the members contains magnetic particles such as particles of a magnetizable material. The magnetic particles are usually relatively small particles of a powder or powder-like consistency and can be used in dry form or can be in a liquid vehicle. One patent that discloses such a magnetic particle construction is Eddens U.S. Pat. No. 3,962,595 which issued June 8, 1976 and is assigned to Applicant's assignee. One of the main purposes for constructing clutches and brakes in the manner described in this specification is to enable the use of such clutches, brakes, and clutch-brake combinations to control speed and braking applications and to be able to use them with standard and available motors and gear boxes such as on NEMA (C) faced motor and gear boxes as well as between a C faced motor and a gear box. Another advantage of the present construction is that both the clutch and the brake construction disclosed herein can be constructed using many of the same or identical parts and components thereby substantially reducing the inventory problems of manufacturing, selling and repairing magnetic particle devices, and by using the same or similar components in brake and clutch constructions some of the problems of coupling such members together are overcome.

It is also novel to the present invention to produce magnetic particle devices which are able to make use of a double 37 C" type coupling means for connecting such devices together and to other devices which have similar type connection means. The construction of the subject devices including the use of a double "C" connection feature enables them to provide soft starts and stops, and to be used to provide better control over tension when applied to a winding or unwinding application, they provide a long life and they also provide smooth controlled torque. Furthermore, the subject constructions require no special coupling members or base plates and produce no alignment problems common to known constructions used for the same or similar purposes. Instead with the present construction different combinations of units can be quickly and accurately connected together thereby substantially simplifying construction and assembly problems.

It is therefore a principal object of the present invention to provide improved means for coupling magnetic particle devices together and to other pieces of equipment.

Another object is to simplify the construction and improve the operating efficiency of magnetic particle devices.

Another object is to teach the construction of magnetic particle devices which have double "C" coupling means which simplifies coupling such devices together and to other equipment.

Another object is to make it easier and simpler to couple together members one or more of which may include a magnetic particle device.

Another object is to teach the construction of a magnetic particle device having improved and more efficient means for circulating cooling air through and closely adjacent to the heat producing members thereof.

Another object is to make magnetic particles safer to use and easier to install.

Another object is to minimize the possibility for loss or undesirable displacement of magnetic powder in a magnetic particle device.

Another object is to reduce the manufacturing, repair and maintenance costs associated with magnetic particle devices.

Another object is to make parts and components in magnetic particle brakes and clutches more uniform and interchangeable.

These and other objects and advantages of the present invention will become apparent after considering the following detailed specification which discloses preferred embodiments thereof in conjunction with the drawings, wherein.

Figures 2, 3:
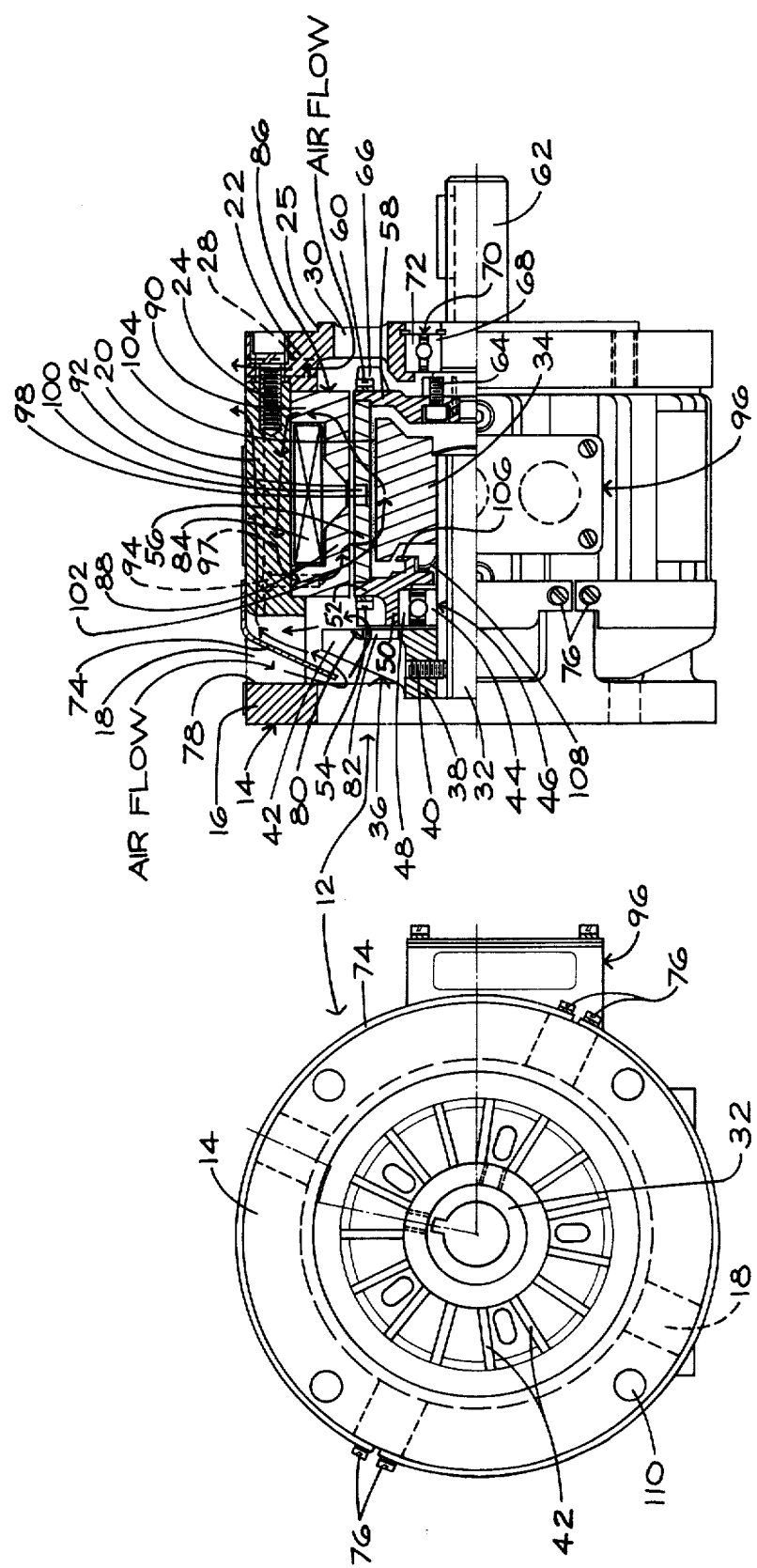
FIG. 2 is a side view partially in cross-section taken on axis of a magnetic particle clutch.
FIG. 3 is a right end view of the magnetic particle clutch shown in FIG. 2.

Referring to the drawings more particularly by reference numbers, number 10 refers to a magnetic particle device constructed according to the teachings of the present invention. In the case of a magnetic particle clutch as shown in FIGS. 2 and 3 provision is made of an input shaft, or its input shaft, to be connected to some other device and in the present clutch construction the input shaft is in alignment with the output shaft. When the input shaft is driven at a particular speed, the output shaft will rotate in the same direction but at a speed depending upon the magnetic coupling provided in the device and on the torque. In the case of a magnetic particle brake, on the other hand, there is a bore provided on the input end of the device and a shaft on the output end. In a typical application the bore in the input end of the brake receives a motor or clutch shaft, or the brake is connected between a motor and a gear box. Since the present construction preferably is constructed to have a double "C" coupling feature for connecting it to other devices it means that it can be connected to other devices having double "C" connection means as well as to devices that have "C" connection means on one end only and this is an advantage. In the case of a magnetic particle brake, the coupling force applied between the relatively movable members is produced magnetically as is the coupling force produced in the clutch construction. In this specification the structural and operational details of the magnetic particle clutch 12 will be described first, reference being made to FIGS. 2 and 3, and the structural and operational details of the brake shown in FIGS. 4 and 5 will be described later.

Referring to FIG. 2, the magnetic particle clutch 12 includes a stator 14 which extends most of the length of the device and includes an annular end portion 16 which is connected by a plurality of integral spaced axial extending portions 18 to an annular housing structure 20 which extends to adjacent the opposite end of the device. The opposite end of the housing structure 20 is connected to another annular end member 22 by a plurality of threaded members such as the threaded member 24. The outer surface of the housing structure 20 is provided with a plurality of axial outwardly extending ribs 26 (FIG. 1) which extends substantially the full length thereof.

Figure 1:
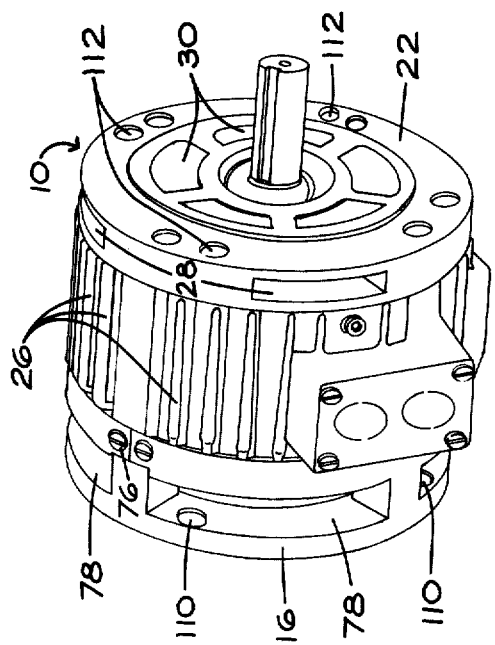
FIG. 1 is a perspective view of a magnetic particle device constructed according to the teachings of the present invention.

The annular end member 22 has formed on it an annular locating step 25, and the member 22 has formed in it a plurality of spaced radially extending passageways 28 which extend therethrough as clearly shown in FIG. 1. The member 22 also has a plurality of axially extending openings or air passages 30 formed therethrough at the locations shown. The passages 28 and 30 communicate with each other and are used in the cooling of the device as will be described.

The clutch 12 has provision for or to receive an input shaft designated generally by 32 which is attached to and rotates with a rotor member 34. Also attached to the input shaft 32 is a fan structure 36 which includes an annular member 38 which is attached to the input shaft structure 32 by means of one or more set screws such as set screw 40 which is positioned in a suitable bore provided therefor in the member 38. The fan structure 36 includes a plurality of outwardly extending fan blades 42 which are shown wider at their inner ends or bases than at their outwardly extending portions, and during operation of the device the fan structure 36 rotates at the same speed as the input shaft 32 and circulates air between portions of the structure in a manner which will be described.

The input shaft 32 also carries an inner race 44 of bearing assembly 46, and the outer race 48 of the assembly 46 is mounted in an annular groove provided therefor in a drive shield member 50. The drive shield member 50 has a portion 52 which extends outwardly from the bearing assembly 46 and is connected by means such as threaded member 54 to one end of a drive cylinder 56. The drive cylinder 56 includes an annular portion which extends around and beyond the opposite ends of the rotor 34 in spaced relationship to the rotor. The opposite end of the drive cylinder 56 from the drive shield 50 is connected to an outwardly extending portion of another end shield member 58 by means such as by threaded members 60. The end shield member 58 is fixedly connected to output shaft 62 by other threaded members 64, and the end shield 58 has a plurality of fins 66 formed thereon for movement in an annular air space or chamber provided therefor adjacent to the end plate 22. From what has been said it is clear that the two end shields 50 and 58 and the drive cylinder 56 as well as the output shaft 62 are connected together and move as an assembly during operation of the clutch 12. Also during rotational movement of this assembly the fins 66 rotate and in so doing circulate cooling air through passages adjacent to certain portions of the device. The air circulated by the fins 66 during operation is brought into the device through the spaced openings 30 in the end plate 22 and is blown radially outwardly through the spaced openings 28. The output shaft 62 has mounted on it an inner race 68 of another bearing assembly 70, and the bearing assembly 70 has an outer race 72 which is positioned in an annular groove formed in the end plate 22. This means that the output shaft 62 and the parts connected thereto rotate relative to the stator structure which includes the annular ring 14, the annular finned housing structure 20 and the end plate 22.

A suitable number of fan guards or deflectors 74 are attached to the annular stator housing structure 20 by threaded members 76 (FIG. 1). The fan guards 74 extend at some angle into spaces 78 formed between the annular members 16 and the structure 20 adjacent to the fan blades 42. When the input shaft 32 and the fan blades 42 rotate, the blades draw air in through the openings 78 and this air moves around the free edges of the fan guards 74 and is deflected outwardly against the fan guards 74 and escapes out through the openings formed by and between the fan guards 74 and the spaced fins 26 formed on the outer surface of the stator structure 20. The fan structure 38 may include an outwardly extending annular portion 80 with spaced openings 82 formed therethrough (FIG. 2). Some of the air that is drawn into the structure by the fans 42 will pass through the apertures 82 and move outwardly therefrom being exhausted as it so moves through the spaces formed by and between the deflectors 74 and the spaced fins 26.

The clutch 12 includes an annular electromagnetic coil 84 which is positioned in an annular magnetic core structure or bobbin 86 located in the housing structure 20. The core structure 86 is formed by two similar spaced portions 88 and 90 which are connected by a narrower portion 92 which extends therebetween. The bobbin 86 is locked into position in the stator housing 20 by threaded members such as threaded member 94. The coil 84 has input electrical leads (not shown) which extend into junction box assembly 96 where they are connected to a suitable source of energy. When energy is applied to the coil 84, the coil establishes a magnetic field which in turn establishes the flux path shown by arrows 97. The flux path extends through the stator member 20, through the bobbin portion 88, through the space between the bobbin portion 88 and the drive cylinder 56 into the associated end of the drive cylinder 56, through the air space between the drive cylinder 56 and the rotor 34, back through the space between the rotor 34 and the opposite end of the drive cylinder 56, through the air space between the drive cylinder 56 and the bobbin portion 90 and back into the annular stator portion 20. The drive cylinder 56 is constructed mostly of a magnetizable material which is divided into two portions located on opposite sides of an annular relatively narrow portion 98. The narrow portion 98 saturates at a low number of lines of flux and because of this presents a relatively high reluctance to the flux so that relatively little of the total flux passes through the section 98 especially as the flux increases past the knee of the saturation curve. The narrow portion 98 of the drive cylinder 56 is formed by forming an annular groove in the member 56 which can be filled with some relatively non-magnetizable material 100 or left unfilled, if desired. With this construction relatively little flux will be established in the member 56 between the portions 88 and 90 and practically all of the flux generated by the coil 84 will therefore be established through the rotor 34 by way of the flux path 97 described above.

In order for the subject device to provide an efficient flux path, particles or a powder of a magnetizable material is positioned to be in the space between the rotor 34 and the drive cylinder 56 when the device is operating. During operation the powder arranges itself at the location in the space between the members 56 and 34 in two spaced annular bands 102 and 104. The presence of the magnetic powder in the presence of the magnetic flux increases the magnetic coupling between the members 56 and 34, and the greater the current flow in the coil 84 the greater will be the coupling between these members. It is also important to the operation of the present device that the magnetic particles be maintained in the device so that they will be able to form into the bands described without being lost by migrating or working into the spaces between the relatively movable members. The present device includes features which prevent the powder particles from escaping from the chamber in which they are located. The means for accomplishing this include the end shield member 50 which has an annular L-shaped flange 106 formed to be positioned under the associated overhanging end edge portion of the rotor 34 so that when the device is inoperative the powder will not be able to fall all the way into the input shaft 32 where it could escape or cause damage. Instead the powder will be caught in the upwardly open space formed by the L-shaped flange 106 when the device is deenergized so that when the device is again operating the powder will be able to move outwardly into the space between the rotor 34 and the drive cylinder 56 where it is needed. The same situation does not exist at the opposite end of the rotor and therefore it is not generally necessary to make similar provision. This is because there are no exposed relatively movable members and no seals or other members where the powder can accumulate and cause problems. The end shield 50 also has an annular groove inwardly of the L-shaped flange facing the input shaft 32, and an annular seal 108 is positioned in the groove to seal between the shield 50 and the input shaft structure 32. The seal 108 also provides further means to keep the powder from the bearing assembly 46.

During operation of the subject device the input shaft structure 32 which may be a tube or a shaft member is coupled to a suitable drive source such as to the output shaft of a motor or gear reducer (not shown), and this causes the rotor 35 to rotate at the speed of the input. The speed of rotation of the output shaft 62 of the clutch 12 will depend upon the speed of the input, the applied torque, and the coupling force provided between the drive cylinder 56, which is connected to the output shaft 62, and the rotor 34. The coupling force in turn depends on the strength of the magnetic field produced by the coil 84. If the flux force generated is relatively strong the coupling force between the input and the output will be great and the output shaft 62, subject to the applied torque, will rotate relatively fast and at or near the speed of rotation of the input structure 32 if little torque is present. On the other hand, if the coupling force is relatively weak the speed of rotation of the output shaft 62, even assuming little or no torque, may be substantially less than the speed of rotation of the input 32, and if no coupling force is produced it can be expected that the output shaft may not rotate at all. When the members 32 and 56 are rotating, the respective fins 42 and 66 will also rotate and circulate air around the various portions of the device including around portions adjacent to the bearing assemblies where the heat produced in the device especially adjacent the powder working faces can be most damaging. No known magnetic particle device provides the same degree of air circulation and the same exposure of the heat producing parts to the circulating air as is provided by the subject construction.

In addition to the novel features and advantages of the present construction described above it is also important to recognize that the subject construction is specifically designed for coupling to other devices including other magnetic particle devices, motors and gear reducers using a conventional double "C" type coupling. In the present construction provision for a double "C" coupling is made by providing unthreaded holes 110 in the annular member 16 and threaded holes 112 in the end plate 22. The double "C" also includes providing the step 25 on the face of the member 22 which step cooperates with a mating portion of a member to be coupled thereto. It is a simple matter then to couple the present construction to another construction having members similar to the members 16 and 22 by providing bolts which extend through the holes 110 in one of the devices and are threaded into the holes 112 in the other devices. The threaded members (not shown) may have hexagonal head portions that can be tightened using a wrench. While the present construction is especially well adapted to double "C" type component couplings it can also be adapted to other forms of couplings.

Figure 5:
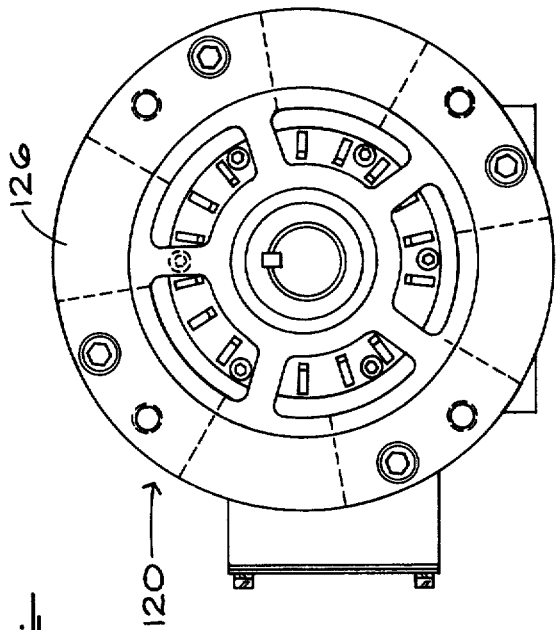
Figure 4:
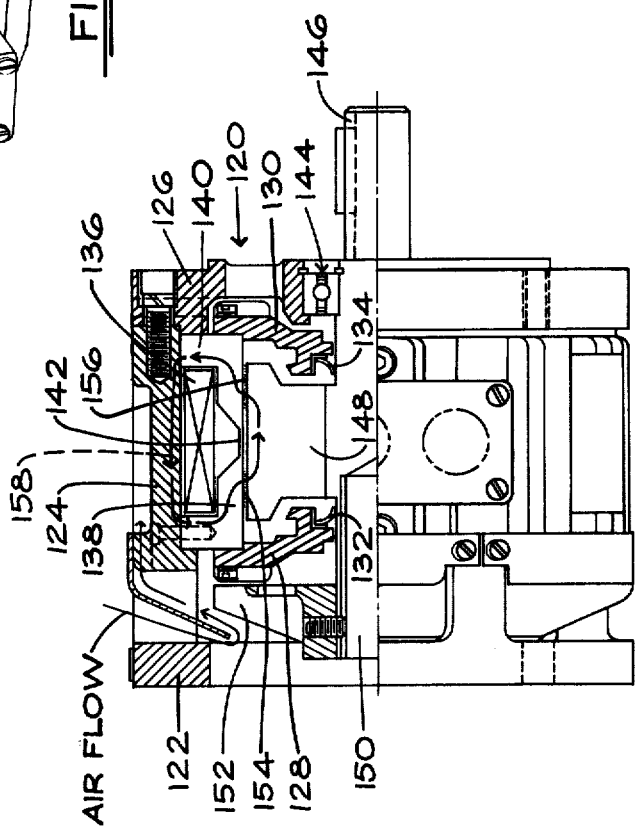
FIG. 4 is a side view partially in cross-section and similar to FIG. 2 showing the structural characteristics of a magnetic particle brake constructed according to the present invention; and, FIG. 5 is a right end view of the magnetic particle brake of FIG. 4.

FIGS. 4 and 5 of the drawings shows a magnetic particle brake construction 120 as distinguished from a magnetic particle clutch. Many of the structural features of the brake 120 are similar to features in the magnetic particle clutch 12 but there are also important differences including the fact that the magnetic particle brake 120 has one of its relatively movable components fixed or non-rotatable and the output shaft has drag or braking force applied to it depending upon the coupling force generated between the relatively movable portions thereof as will be described. In the description of the brake 120, only those portions which are different from corresponding portions of the clutch will be described in detail. The operation of the brake 120 is similar to the operation of the clutch except that in the case of the brake the coupling force is produced between stationary and movable members rather than between relatively movable members, both of which are rotatable.

The stationary or non-rotatable portions of the brake 120 include the members 122, 124, 126, the end shields 128 and 130, seals 132 and 134, coil 136, and magnetic core members 138, 140 including the gap forming portion 142 thereof. The end plate member 126 has means to receive a bearing assembly 144 which has its inner race mounted on the rotatable portion or output shaft 146 of the subject brake structure. The rotatable portion also includes rotor 148, tubular extension 150, and fan means 152 mounted on the extension 150. In the brake structure as in the clutch structure, a space is formed around the rotor 148 which contains magnetizable particles which accumulate in bands 154 and 156 to produce magnetic coupling between the structure formed by the core members 138 and 140 and the rotor 148. In the case of the brake 120 current flow in the coil 136 generates a magnetic field that produces flux path 158 shown in dotted outline in FIG. 4. In the case of the brake the flux path is established more directly between the core members 138 and 140 and the rotor 148 in that it does not have to go through an intermediate member such as the member 56 (FIG. 2).

When the brake 120 is coupled to a rotating member by coupling its output shaft 146 thereto, the braking force is generated by current flow in the coil 136 which establishes the flux path 158 described above. The stronger this flux path, the greater will be the braking action.

The brake 120 like the clutch 12 is adapted to use a "C" type connection or coupling for connecting it to a motor, a clutch, or some other suitable device. The brake 120, like the clutch 12, has a fan portion 152 which rotates with the rotor 148 and the output shaft 146, and in so doing causes air flow into and around portions of the subject device where heat is generated. However, unlike the clutch, the brake does not have fan means on the other end but does have passages through which air can circulate to carry away generated heat.

FIGS. 3 and 5 are end views of the respective devices 12 and 120 and are included to show in greater detail the features of the ends of the devices and particularly details of the connection means which can be "C" or double "C" types. The manner in which devices such as the subject devices are connected together and to associated equipment, and the advantages obtained thereby are important to the invention. This is because most of the high heat producing portions of the subject devices are located internally and it is important to provide means to dissipate this heat. The means for connecting the subject devices to other devices are preferably "C" or double "C" type connection means which provide sturdy, easy to assembly, in-alignment connections to adjacent equipment, and are constructed so that openings are present into the devices through which air can be drawn in and expelled by fan means located internally and operated by movement of the movable portions of the devices. This enables the present devices to continuously circulate a relatively large volume of air over and around the high heat producing portions, including around the bearing members, and means that the present devices can be operated even in close quarters for long periods without overheating. No known magnetic particle devices used for the same or similar purposes have these important advantages.

Thus there has been shown and described several different embodiments of magnetic particle devices which fulfill all of the objects and advantages sought therefor. It will be apparent to those skilled in the art, however, that many changes, modifications, alterations and other uses and applications of the subject device are possible, and all such that come within the scope of the invention are deemed to be covered by the invention which is limited only by the claims which follow.

What is claimed is:

1. A magnetic particle device having relatively movable input and output members, said input and output members respectively having cylindrical surfaces positioned in radially opposed relationship forming an air space therebetween, means forming a chamber in the device that includes the air space between said relatively movable members, magnetic particles positioned in said chamber, stationary electromagnetic means positioned outwardly of said members and of the air space therebetween, said electromagnetic means being energizable to establish a flux path that includes portions of said input and output members and the air space therebetween, said flux causing some of the magnetic particles to form in bands in the air space between said members whereby said flux path produces magnetic coupling therebetween, means journaling one of said relatively movable members for movement relative to the other, means in said device forming a path for the circulation of air adjacent to one end of said device, said path forming means including a shield member mounted on the stationary electromagnetic means and extending inwardly therefrom, and fan means on one of said relatively movable members adjacent to said one end and inwardly from the deflector member to circulate air through said air circulation path to cool the portions of the device adjacent thereto during operation of the device.

2. The magnetic particle device defined in claim 1 wherein means are provided forming a path for the circulation of air adjacent to each opposite end of said device, both of said input and output members being rotatable, and each having means thereon adjacent respective opposite ends of the device to circulate air through the air circulation path thereat during operation of the device.

3. The magnetic particle device defined in claim 1 wherein said device includes a housing having spaced end wall members and an annular housing portion extending therebetween, means for connecting the end wall members to the annular housing portion, at least one of said end walls having means therein forming an outwardly extending air flow passage which communicates with the air circulation path in the device to atmosphere.

4. The magnetic particle device defined in claim 1 including means connected to one end of said device forming one part of a double "C" type connection for connecting said device to other devices having complementary type connection means thereon, said one part of the double "C" connection having aperture means therethrough which communicate the air circulation path to atmosphere.

5. The magnetic particle device defined in claim 1 including an annular housing portion for said device, said electromagnetic means being positioned in said annular housing portion, means forming a plurality of spaced outwardly and axial extending fins on said annular housing portion, means adjacent one end of said housing portion forming radial extending openings into the device, said shield member having a first portion attached to said annular housing and extending therearound in engagement with the outwardly extending housing fins to form openings therewith, said shield member having other portions angularly related to the first portion extending into respective ones of the radial extending housing openings.

6. The device defined in claim 1 wherein one of said relatively movable input and output members is rotatable and the other is non-rotatable.

7. The device defined in claim 1 wherein both said input and said output members are rotatable, one of said input and output members having a portion positioned extending between the electromagnetic means and the other of said input and output members.

8. A magnetic particle device comprising a housing having spaced end portions and an annular portion extending therebetween, an annular magnetizable core structure having spaced connected core portions and a coil positioned therein, said core structure being positioned in the annular housing portion between the spaced housing end portions, a rotatable member including journaling means therefor rotatably positioned in the housing, said rotatable member having a portion extending outwardly to adjacent the core structure to form an annular air space therebetween, means including the annular air space forming a chamber in the device, particles of a magnetizable material positioned in said chamber, means including one of said spaced housing end portions forming a circuitous air flow passage in the device adjacent to one end thereof, said air flow passage including aperture means in the housing communicating the air flow passage to atmosphere, a deflector member attached to the housing and having a portion thereof extending angularly into the aperture means and means on said rotatable member for circulating air through said air flow passage and around the deflector member to cool portions of the device adjacent thereto during operation of the device.

9. The magnetic particle device defined in claim 8 wherein a circuitous air flow passage is located within and adjacent each opposite end of the device, each of said circuitous air flow passages including aperture means to atmosphere, a second rotatable member and means journaling said second rotatable member for rotation in the housing, said rotatable member and said second rotatable member having respective means thereon located adjacent to opposite ends of the housing for circulating air through the respective circuitous air flow passages and aperture means during operation of the device.

10. The magnetic particle device defined in claim 8 including means associated with said rotatable member to prevent the magnetizable particles from escaping from the chamber.

11. The magnetic particle device defined in claim 9 including means adjacent each opposite end of the annular air space to prevent the magnetizable particles from escaping from the chamber.

12. A magnetic particle device comprising a housing having spaced end portions and an annular portion extending therebetween, an annular magnetizable core structure having spaced connected core portions and a coil positioned therein, said core structure being positioned in the annular housing portion between the spaced housing end portions, a rotatable member including journal means therefor rotatably positioned in the housing, said rotatable member having a portion extending outwardly to adjacent the core structure to form an annular air space therebetween, means including the annular air space forming a chamber in the device and particles of a magnetizable material positioned in said chamber, the improvement comprising means forming the male portion of double "C" connection means on one of said housing end portions and means forming a complementary female portion of a double "C" connection means on the opposite housing end portion whereby the subject device can be connected to devices having similar "C" connection means on at least one end thereof, each of said male and female portions of the double "C" connection means having radial passages extending therethrough and means on said rotatable member for circulating cooling air through the radial passages at at least one end of the device.

* * * * *